United States Patent [19]

Kumagai

[11] 4,165,782
[45] Aug. 28, 1979

[54] AUTOMOBILE AIR-CONDITION INDICATOR
[75] Inventor: Naotake Kumagai, Nissincho, Japan
[73] Assignee: Mitsubishi Jidosha Kogyo Kabushiki Kaisha, Japan
[21] Appl. No.: 882,062
[22] Filed: Feb. 28, 1978
[30] Foreign Application Priority Data
   Jan. 13, 1978 [JP] Japan .................................. 53/3062
[51] Int. Cl.² .................... B60H 1/00; B60Q 11/00; G08B 5/36
[52] U.S. Cl. .............................. 165/11; 73/432 AD; 165/43; 237/12.3 B; 340/52 F; 340/525
[58] Field of Search ............... 165/11, 42, 43; 62/126; 236/94; 340/52 F, 524, 525, 79, 286 M, 82; 73/432 AD; 123/41.15; 237/12.3 B

[56] References Cited
   U.S. PATENT DOCUMENTS
   3,626,370  12/1971  Stubbs ............................ 340/524 X
   3,697,946  10/1972  Nishioka ............................ 340/82
   3,939,456   2/1976  Curtis ............................... 236/94 X
   4,016,534   4/1977  Kobayashi et al. .............. 340/52 F
   4,025,896   5/1977  Hintze et al. ..................... 340/79 X
   4,035,764   7/1977  Fujinami et al. ................. 340/52 F
   4,038,061   7/1977  Anderson et al. ................. 62/126
   4,109,235   8/1978  Bouthors ......................... 340/52 F Primary Examiner—Albert W. Davis, Jr.
Assistant Examiner—Margaret A. Focarino
Attorney, Agent, or Firm—Robert E. Burns; Emmanuel J. Lobato; Bruce L. Adams

[57] ABSTRACT

An automobile air-condition indicator, having a display panel on which contours of the automobile body and instrument panel are drawn, that indicates whether or not and in what direction air flows into and out of an air conditioner by indications of letters and arrows illuminated by lamps interlockingly with the operation of an air conditioner operating device, so that any common driver can perceive the operation of the air conditioner at a glance.

18 Claims, 18 Drawing Figures (a) $Q_1$
(b) $\bar{Q}_1$
(c) $Q_2$
(d) $\bar{Q}_2$ (e) $A_1$
(f) $A_2$
(g) $A_3$
(h) $A_4$

AUTOMOBILE AIR-CONDITION INDICATOR

DETAILED DESCRIPTION OF THE INVENTION

This invention relates to an air-condition indicator that pictorially indicates on a display panel whether or not, and in what direction, air is supplied for at-a-glance perception by the driver, interlocked mainly with operating apparatus of an automobile's air conditioner.

Conventionally, the operating conditions of an air conditioner have been indicated simply by pilot lamps or by letters (ex., "HEAT" or such abbreviations as "DEF") in individual operating sections.

These indicating means, however, have been unable to make the driver in the ordinary driving position effortlessly see whether or not air is flowing in through the entry-vents. With the abbreviations etc., in addition, the driver has found it difficult to tell the exact vent through which air comes in. For this reason, conventional automobile manuals have devoted many pages to the detailed description of the air-condition indicating system.

To eliminate these shortcomings, the indicator according to this invention pictorially shows switching of many dampers of the air conditioner, either individually or in combination, so that any common man can perceive their operations at a glance. That is, whether or not, and in what direction, the air conditioner is supplying air is indicated by lamps that are interlocked with the operating levers thereof.

Now this invention will be described by reference to several embodiments thereof.

Figure 1:
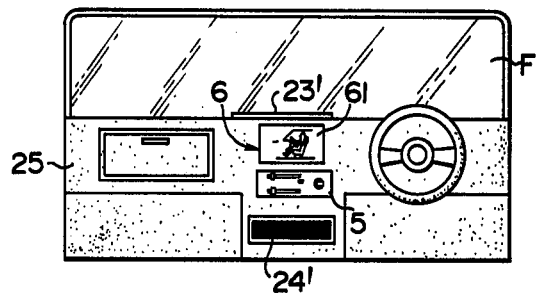
FIG. 1 is a general view showing a first embodiment of this invention.
Figure 2:
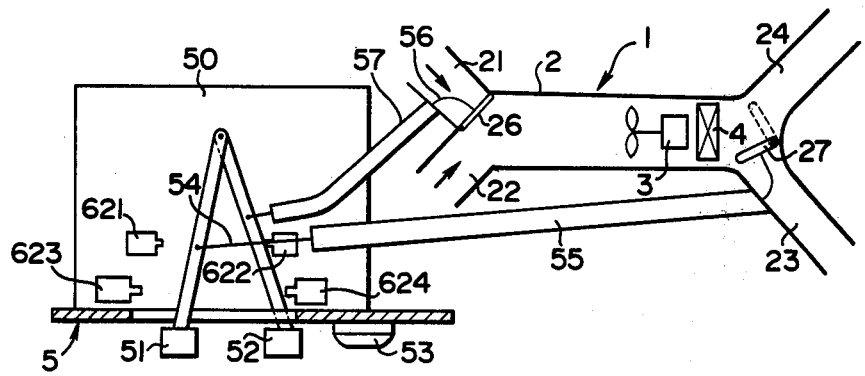
FIG. 2 is a schematic view showing an air conditioner proper 1 and an air conditioner operating device 5 of the first embodiment.
Figure 3:
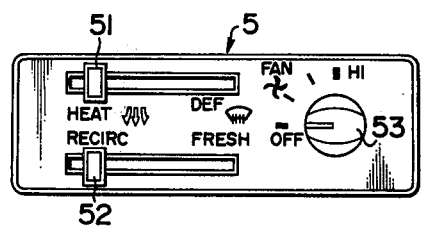
FIG. 3 is a front view of the air conditioner operating device 5 of FIG. 1.
Figure 4:
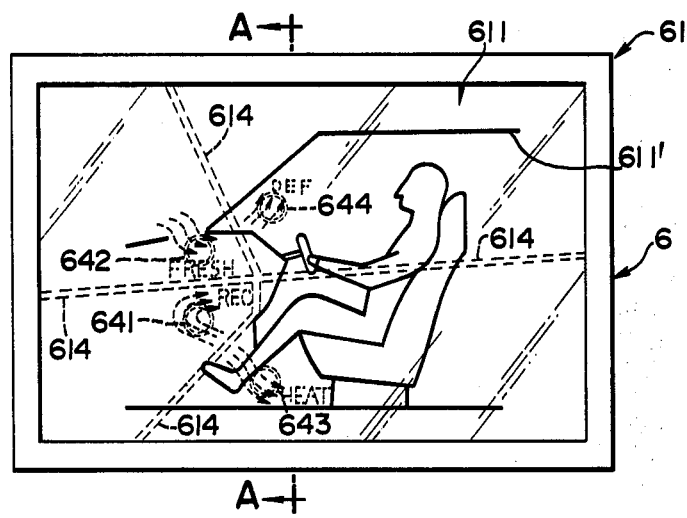
FIG. 4 is a front view of a display section 61 of the first embodiment.
Figure 5:
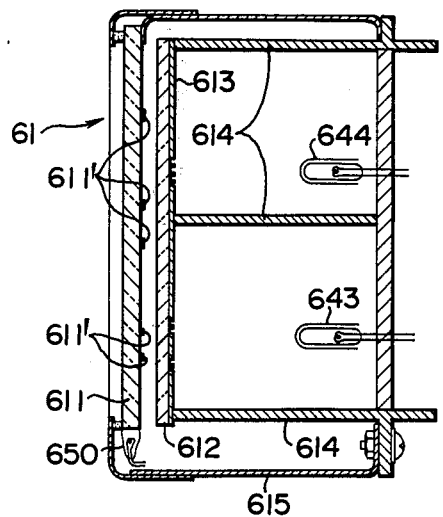
FIG. 5 is a cross-sectional view taken along the line A—A of FIG. 4.

In the first embodiment shown in FIGS. 1 through 6, an automobile's air conditioner proper 1 comprises an air duct 2, a fan unit 3, and a heater core 4. One end of the air duct 2 bisects into a fresh-air intake duct 21 and a foul-air intake duct 22. The other end thereof also bisects into a defroster blow-out duct 23 and an underfoot blow-out duct 24. The fresh-air intake duct 21 communicates with a fresh-air intake port that opens outward in the car front, and the foul-air intake duct 22 with a foul-air intake port opening below an instrument panel 25 in the cabin, both ports being not shown. Likewise, the defroster blow-out duct 23 communicates with a defroster blow-out port 23' opening toward the front glass F at the top of the instrument panel 25, and the underfoot blow-out duct 24 with an underfoot blow-out port 24' opening in the lower portion of the instrument panel 25. There is provided a first damper 26 between the fresh-air intake duct 21 and the foul-air intake duct 22, and a second damper 27 between the defroster blow-out duct 23 and the underfoot blow-out duct 24. The fan unit 3 is fitted in the air duct 2 between the first damper 26 and second damper 27, and a heater core 4 in the air duct 2 between the fan unit 3 and the second damper 27. By actuating a valve not shown, engine cooling water is fed.

An air conditioner operating device 5 is installed in the instrument panel 25 and comprises a casing 50, a switch lever 51, an in-and-out lever 52, and a fan switch 53. The switch lever 51, pinned to the casing 50, connects with the second damper 27 through a first internal wire 54. A first external conduit 55, through which the first internal wire 54 passes slidably, is fixed to the air duct 2 at one end and to the casing 50 at the other. The in-and-out lever 52, pinned to the casing 50, connects with the first damper 26 through a second internal wire 56. A second external conduit 57, through which the second internal wire 56 passes slidably, is fixed to the air duct 2 at one end and to the casing 50 at the other. When the switch lever 51 is turned to "HEAT" position (i.e., the left end in FIGS. 1 and 3), the second damper 27 closes the defroster blow-out duct 23 and opens the underfoot blow-out duct 24. When the switch lever 51 is turned to "DEF" position (i.e., the right end in FIGS. 1 and 3), the second damper 27 opens the defroster blow-out duct 23 and closes the underfoot blow-out duct 24. On turning the in-and-out lever 52 to "RECIRC" position (i.e., the left end in FIGS. 1 and 3), the first damper 26 opens the foul-air intake duct 22 and closes the fresh-air intake duct 21. On turning the in-and-out lever 52 to "FRESH" position (i.e., the right end in FIGS. 1 and 3), the first damper 26 opens the fresh-air intake duct 21. By turning on the fan switch 53, the fan unit 3 starts to operate.

An air conditioning indicator 6 comprises a display section 61 and a control section 62. The display section 61, comprising a display panel 611, a smoked panel 612, a shielding plate 613, partitions 614 and a casing 615, is provided above the air conditioner operating device 5 in the instrumental panel 25. The display panel 611 is a transparent plate of glass or acrylic resin that is fixed to the casing 615 on all sides, drawn with contours 611' of the automobile front glass, bonnet, roof, floor, instrument panel and driver in white or other readily discernible color on the back thereof, and illuminated by a lamp 650 from below. The smoked panel 612 such as blackish or dark gray glass (ordinary or frosted) or semitransparent acrylic resin in dark color is disposed behind the display panel 611, leaving a small space therebetween. The shielding plate 613 is attached to the back of the smoked panel 612. The shielding plate 613 is cut to form letters and arrows to indicate the flow of air into and out of the air conditioner proper 1. An indication "FRESH" and adjacent arrows cut in the shielding plate 613, in combination, indicate the in-flow of air from the fresh-air intake port into the air conditioner proper 1. An indication "REC" and adjacent arrows cut in the shielding plate 613, in combination, indicate the in-flow of air from the foul-air intake port into the air conditioner proper 1. An indication "HEAT" and adjacent arrows cut in the shielding plate 613, in combination, indicate the out-flow of air from the air conditioner proper 1, the underfoot blow-out duct 24 and the underfoot blow-out port 24', in that order. An indication "DEF" and adjacent arrows cut in the shielding plate 613, in combination, indicate the out-flow of air from the defroster blow-out port 23' of the air conditioner proper 1 toward the front glass F. The partitions 614 are disposed behind the shielding plate 613 so that spaces behind the indications "FRESH," "REC," "HEAT," and "DEF" and their respective arrows do not optically communicate with each other (see FIG. 4). A first lamp 641, green in color, is provided in the space behind the indication "REC" and its arrows, a second lamp 642, green, in the space behind the indication "FRESH" and its arrows, a third lamp 643, orange, in the space behind the indication "HEAT" and its arrows, and a fourth lamp 644, orange, in the space behind the indication "DEF" and its arrows.

The first and second lamps 641 and 642 each comprise a colorless lamp covered with a transparent, green cap. Likewise, the third and fourth lamps 643 and 644 each comprise a colorless lamp covered with a transparent, orange cap.

The illuminating lamp 650 connects with a lighting switch that lights up the headlights, direction lights and other lights of the automobile.

The control section 62 comprises first to fourth microswitches 621 through 624 provided in the air conditioner operating device 5 and said first to fourth lamps 641 through 644. The first microswitch 621 is adapted to turn on when the in-and-out lever 52 turns to "RECIRC" position in FIG. 3, and the second microswitch 622 when the in-and-out lever 52 turns to "FRESH" position in FIG. 3, individually coming in contact with said in-and-out lever 52. The third microswitch 623 is adapted to turn on when the switch lever 51 turns to "HEAT" position in FIG. 3, and the fourth microswitch 624 when the switch lever 51 turns to "DEF" position in FIG. 3, individually coming in contact with said switch lever 51. The first microswitch 621 is connected to the IG terminal of an ignition key switch K.S. at one end and grounded through the first lamp 641 at the other. The second microswitch 622 is connected to said IG terminal at one end and grounded through the second lamp 642 at the other. The third microswitch 623 is connected to said IG terminal at one end and grounded through the third lamp 643 at the other. And the fourth microswitch 624 is connected to said IG terminal at one end and grounded through the fourth lamp 644 at the other.

Now the operation of this first embodiment will be described.

First, the ignition key switch K.S. is turned to "IG" position.

Then, on turning the in-and-out lever 52 to "RECIRC" position, the first damper 26 opens the foul-air intake duct 22 ready to permit the air in the cabinet to flow into the air conditioner proper 1 and, at the same time, the first microswitch 621 turns on. If the fan switch 53 is turned on in this state, the air conditioner proper 1 draws in the air in the cabinet. Then, electricity is supplied from a battery not shown, through the IG terminal of the ignition key switch K.S. and the first microswitch 621, to the first lamp 641 to emit a green light. This light passes through the indication "REC" and the adjacent arrows, the smoked panel 612 and the display panel 611, so that the driver can see the indication "REC" and the arrows radiating in green.

On turning the in-and-out lever 52 to "FRESH" position, the first damper 26 opens the fresh-air intake duct 21 to permit the outside air to flow into the air conditioner proper 1 and, at the same time, the second microswitch 622 turns on. Then, electricity flows from the IG terminal through the second microswitch 622 to the second lamp 642 to emit a green light. This light passes through the indication "FRESH" and the adjacent arrows, the smoked panel 612 and the display panel 611, so that the driver can see the indication "FRESH" and the arrows radiating in green.

When the switch lever 51 is turned to "HEAT" position, the second damper 27 opens the underfoot blow-out duct 24 to permit the out-flow of air from the underfoot blow-out port 24' and, at the same time, the third microswitch 623 turns on. Then, electricity flows through the third microswitch 623 to the third lamp 643 to emit an orange light. This orange light makes the indication "HEAT" and the adjacent arrows discernible.

On turning the switch lever 51 to "DEF" position, the second damper 27 opens the defroster blow-out duct 23 to permit the out-flow of air from the defroster blow-out port 23' and, at the same time, the fourth microswitch 624 turns on. Consequently, electricity flows through the fourth microswitch 624 to the fourth lamp 644 to emit an orange light. This orange light makes the indication "DEF" and the adjacent arrows luminous in orange.

As described above, the display panel 611 gives luminous indications corresponding to actual conditions of air flowing into and out of the air conditioner proper 1. Accordingly, the driver can learn the operating condition of the air conditioner proper 1 with great ease. Also, anyone unfamiliar with the operation of the air conditioner can readily let air flow out from any desired port and introduce air into the air conditioner proper 1, either from inside or from outside the automobile, by simply watching the indication on the display panel 611. Covered by the smoked panel 612 in front, the indications are not visible to the driver when the first to fourth lamps 641 through 644 are not alight. Good visibility is insured since only such indication whose corresponding lamp is alight is seen.

Provision of the display panel 611 next to the air conditioner operating device 5 makes it possible to effortlessly watch the display panel 611 while operating the air conditioner operating device 5.

The colors of the first to fourth lamps 641 through 644 in the above-described embodiment need not be limited to green and orange, but all lamps may be of the same color.

The material of the display panel 611 may be changed into the same as the smoked panel 612, thereby the latter 612 can be omitted.

In the above first embodiment, the contours 611' of the front glass, bonnet, instrument panel, driver and so on are drawn in white or other readily discernible color on the back of the display panel 611. They may also be drawn with V-shaped notches cut in the back of the display panel 611, with the illuminating lamp 650 connected to the IG terminal of the ignition key switch and the fan switch 53 so that the illuminating lamp 650 be lit whenever the indicator 6 is operated.

In addition, Fresnel lenses may be fitted on the indications "FRESH," "REC," "HEAT," and "DEF" and their arrows.

Figure 7:
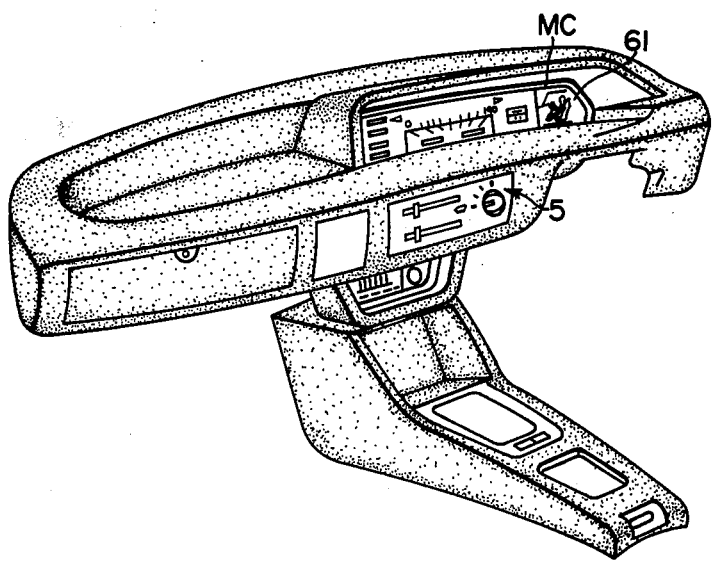
FIG. 7 is a perspective view showing another arrangement of the air conditioner operating device 5 and the display section 61.
Figure 8:
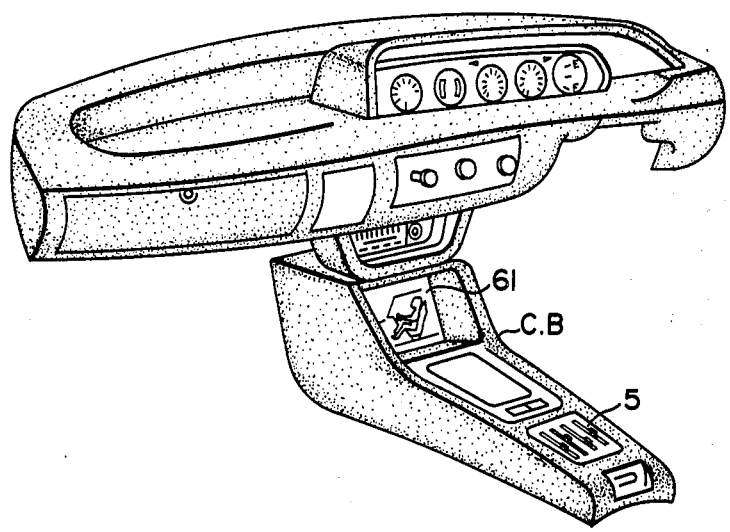
FIG. 8 is a perspective view showing still another arrangement of the operating device 5 and the display section 61.
Figure 9:
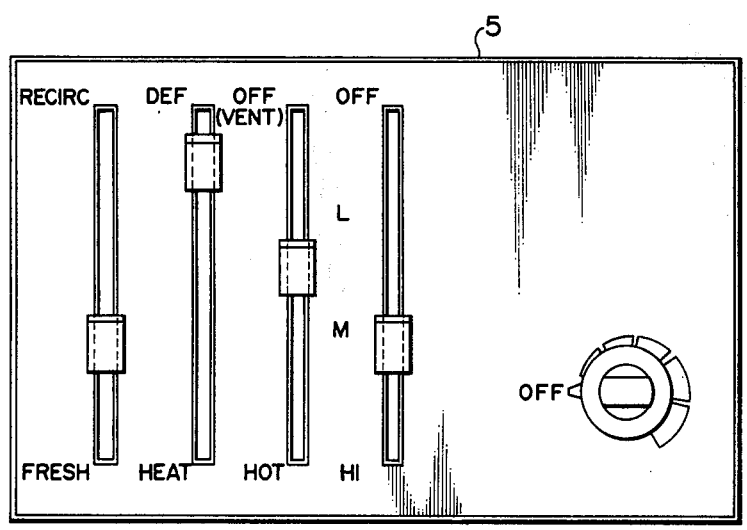
FIG. 9 is a front view of a preferable embodiment of the operating device 5 used in FIG. 8.

In the above-described first embodiment, the display section 61 is provided next to the air conditioner operating device 5. The display section 61 may also be provided in a meter cluster MC as shown in FIG. 7. The display section 61 may be provided in the front portion of a center console box CB, with the air conditioner operating device 5 disposed in the rear portion thereof, too, as shown in FIG. 8. In this arrangement, the operating device 5 of a modified design shown in FIG. 9 is preferable.

Figure 10:
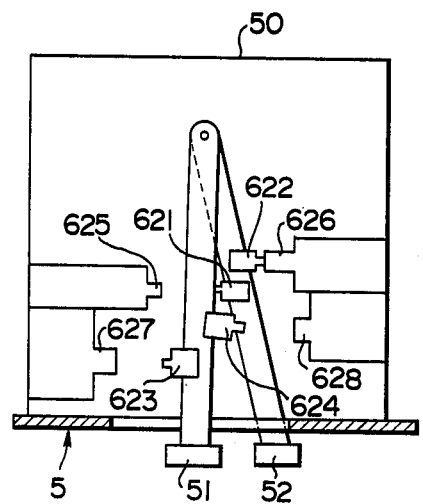
FIG. 10 is a schematic view illustrating principal parts of a second embodiment of this invention.

In the second embodiment shown in FIG. 10, the in-and-out lever 52 and the switch lever 51 are fitted with the first and second microswitches 621 and 622 and the third and fourth microswitches 623 and 624, respectively. Projections 625, 626, 627 and 628 are formed on the inside of the casing 50 of the air conditioner operating device 5 to constitute switching members in conjunction with the microswitches 621 through 624 that come in contact therewith.

Figure 11:
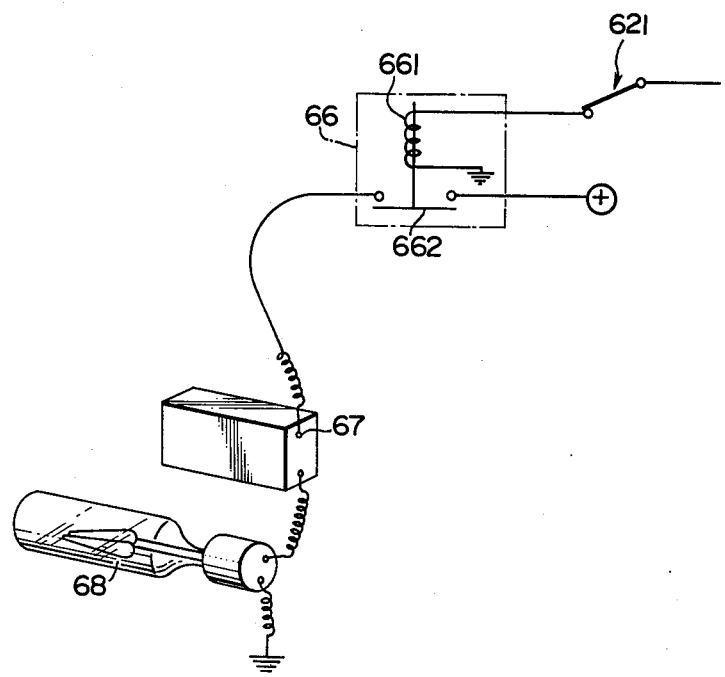
FIG. 11 is a schematic view of a third embodiment of this invention.

FIG. 11 shows the third embodiment in which a flicker cathode glow lamp is used, in place of an ordinary lamp used in the first example, as the first lamp 641 to illuminate the indication "RECIRC".

Figure 6:
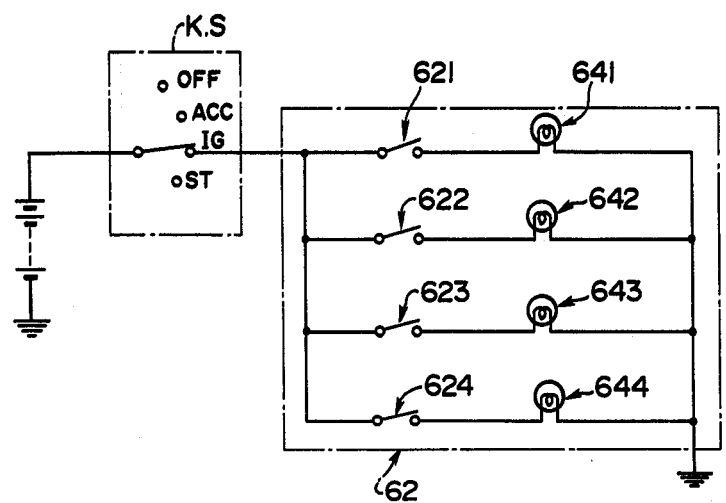
FIG. 6 is a circuit diagram showing a control section 62 of the first embodiment.

In FIG. 11, an exciting coil 661 of a relay 66 is connected in the position of the first lamp 641 of FIG. 6. A switch contact 662 of the relay 66 is placed between the battery and an inverter (a D.C. to A.C. converter) 67. The inverter 67 connects with the flicker cathode glow lamp 68 provided behind the indication "REC" and its arrow. When the in-and-out lever 52 moves to "RECIRC" position and the first microswitch 621 turns on, the exciting coil 661 becomes energized to close the switch contact 662, whereupon D.C. current flows from the battery to the inverter 67, and thence A.C. current to the flicker cathode glow lamp 68. Then, the lamp 68 turns on to emit a flowing light that illuminates the indication "REC" and its arrows with the light that flows from one end to the other.

By similarly arranging, all indications and arrows are illuminated with the moving light that looks like the flow of air.

Figure 12:
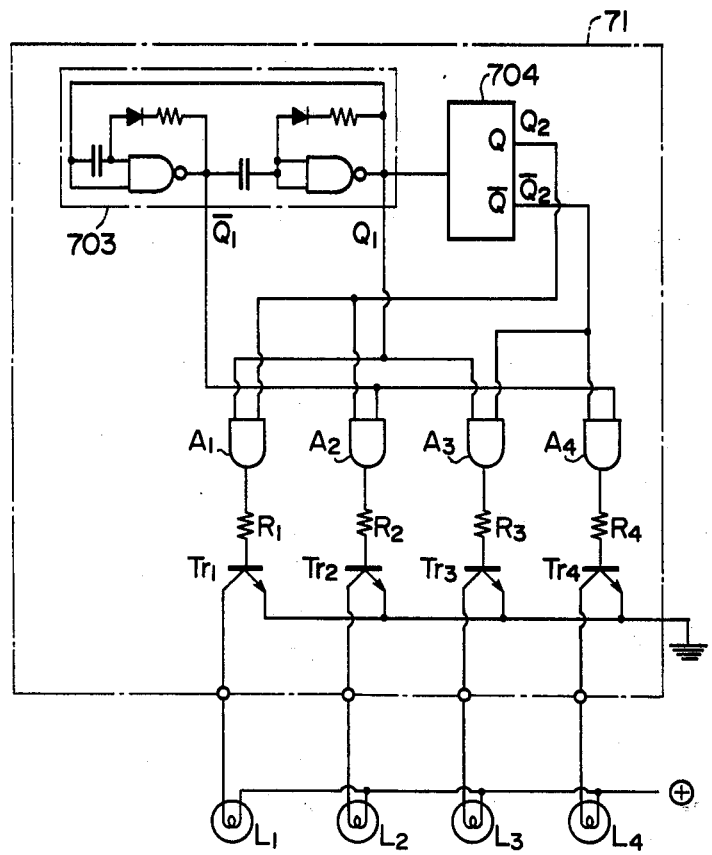
FIG. 12 is a circuit diagram showing principal parts of a fourth embodiment of this invention.

As described above, the indications are illuminated by the moving luminous points of the flicker cathode glow lamp 68. In the fourth embodiment shown in FIGS. 12 through 14, in contrast, each of the first to fourth lamps 641 through 644 is composed of four lamps L1 through L4. By successively turning on and off these four lamps by use of a sequential circuit 71, the indications, especially the arrows, are illuminated in such a manner as to produce the image of air flow.

The four lamps L1 through L4, which constitute the first lamp 641 connected to the first microswitch 621, connect with transistors Tr1 through Tr4 of the sequential circuit 71. The sequential circuit 71 comprises an oscillation circuit 703, comprising NAND gates, capacitors, diodes and resistors, a binary counter 704, four AND gates A1 through A4, four resistors R1 through R4, and the transistors Tr1 through Tr4.

Figure 13:
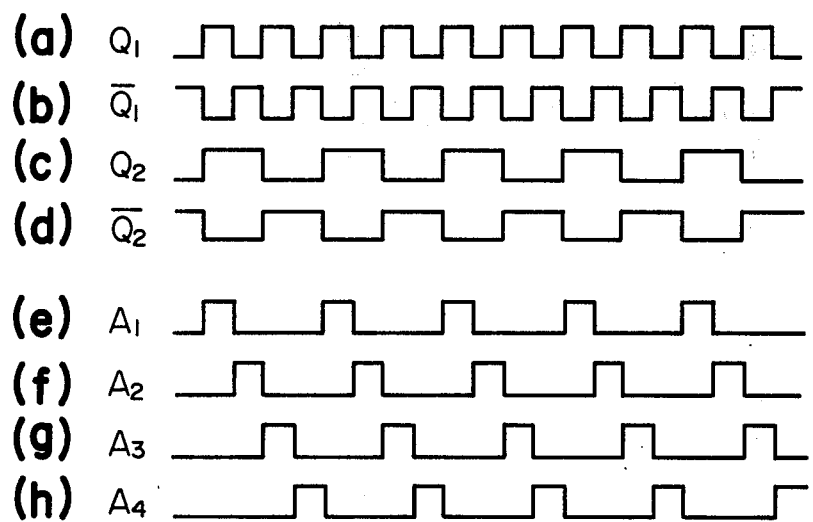
FIG. 13 is a graphical representation of output signals of an oscillating circuit 703, a binary counter 704, and AND gates A1 through A4.

On turning the ignition key switch K.S., not shown, to "IG" position, the oscillation circuit 703 alternately generates a Q output signal Q1 and a $\overline{Q}$ output signal $\overline{Q1}$. The Q output signal Q1 generated by the oscillation circuit 703, designated by (a) in FIG. 13, is supplied to the binary counter 704 and also to the AND gates A1 and A3. The $\overline{Q}$ output signal $\overline{Q1}$, designated by (b) in FIG. 13, is supplied to the AND gates A2 and A4. Receiving the intermittent supply of the Q output signal Q1, the binary counter 704 generates a Q output signal Q2 and a $\overline{Q}$ output signal $\overline{Q2}$ at a time, as designated by (c) and (d) in FIG. 13. The Q output signal Q2 is supplied to the AND gates A1 and A2, and the $\overline{Q}$ output signal $\overline{Q2}$ to the AND gates A3 and A4.

Figure 14:
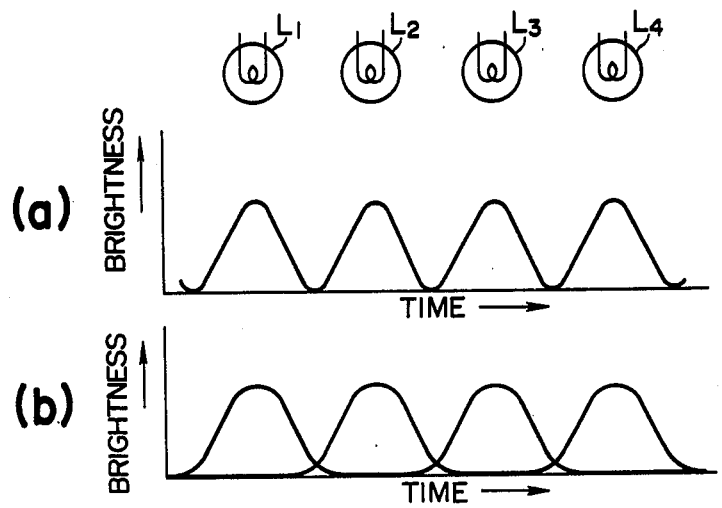
FIG. 14 is a graphical representation of the lighting condition of lamps L1 through L4.

When the first microswitch 621 turns on and the Q output signals Q1 and Q2 and the $\overline{Q}$ output signals $\overline{Q1}$ and $\overline{Q2}$, (a) through (d) in FIG. 13, are fed to the AND gates A1 through A4, the AND gates A1 through A4 each generate an output "H", as designated by (e) through (h) in FIG. 13, to put the transistors Tr1 through Tr4 into conduction. As shown in FIG. 14 (a), the lamp L1 alone turns on first, which is followed by the turning off of the lamp L1 and the turning on of the lamp L2, which is in turn followed by the similar, individual turning on of the lamps L3 and L4. By repeating this cycle, the lamps L1 through L4 turn on and off, intermittently and successively. The second to fourth lamps 642 through 644 are arranged in the same way as the first lamp 641. By this successive lighting of the lamps, all indications effectively show the flow of air.

It is preferable that the lamps L1 through L4 in the fourth embodiment be so arranged as to successively turn on in the direction of the indicating arrow.

FIG. 14 (b) shows a modification in which provision is made so that the end output of one AND gate (for instance, A1) overlaps with the initial output of the adjacent AND gate (A2). This arrangement causes the end lighting period of the corresponding lamp L1 to overlap with the initial lighting period of the adjacent lamp L2. This makes the successive lighting of the lamps smoother and, consequently, the indication of air-flow more effective.

Figure 15:
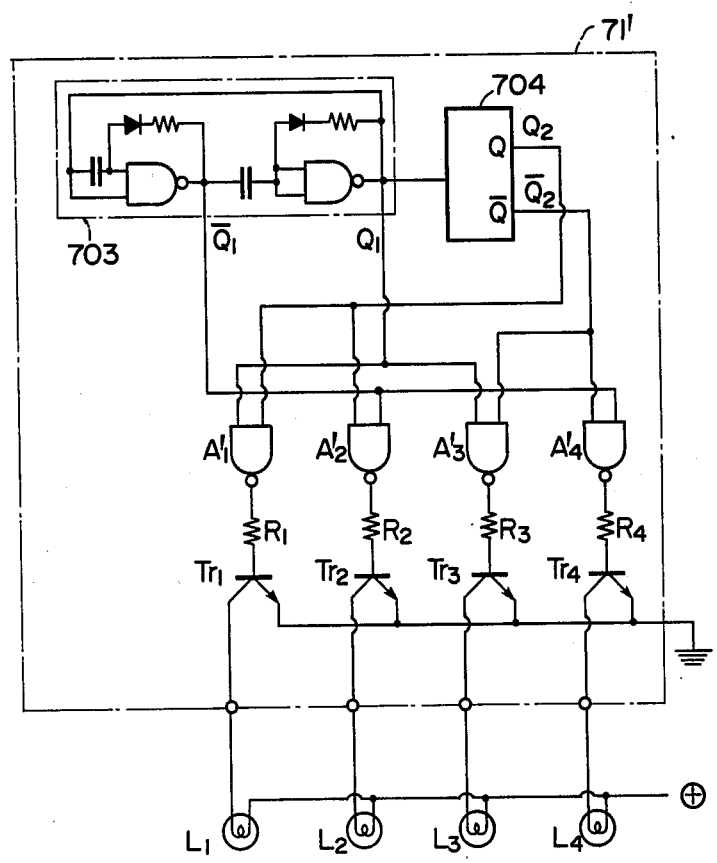
FIG. 15 is a circuit diagram showing another example of a sequential circuit 71.

When the sequential circuit 71 of the fourth embodiment is replaced by a sequential circuit 71' shown in FIG. 15, wherein NAND gates A1' through A4' substitute for the AND gates A1 through A4 of said circuit 71, the lamps L1 through L4 usually are all alight, and turn off successively, one at a time, when the sequential circuit 71' operates.

Figure 16:
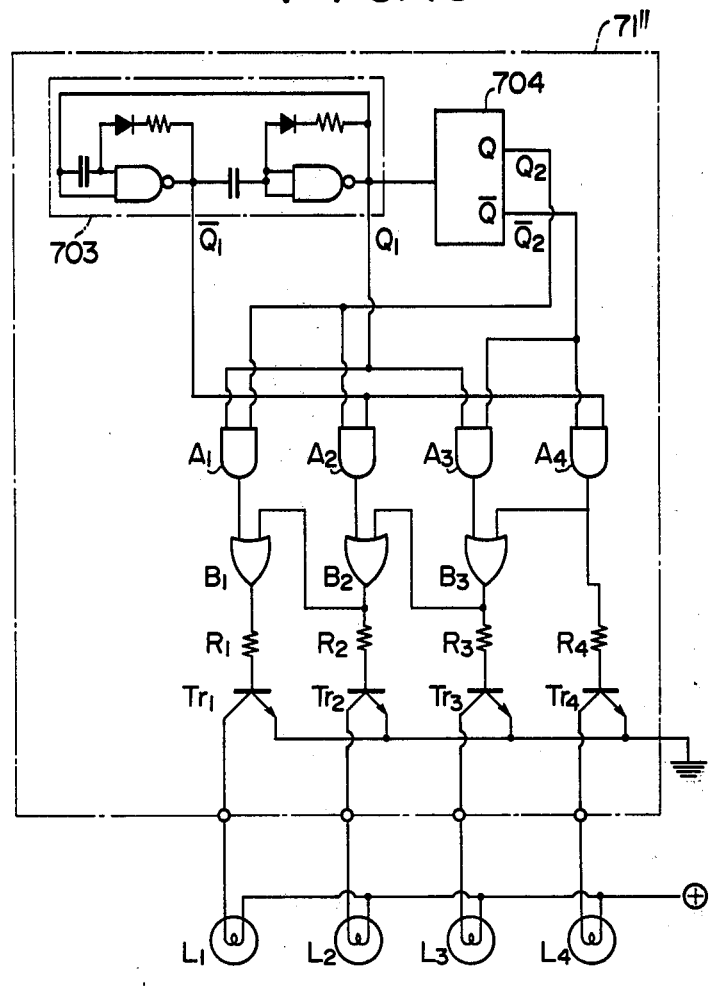
FIG. 16 is a circuit diagram showing still another example of the sequential circuit 71.
Figure 17:
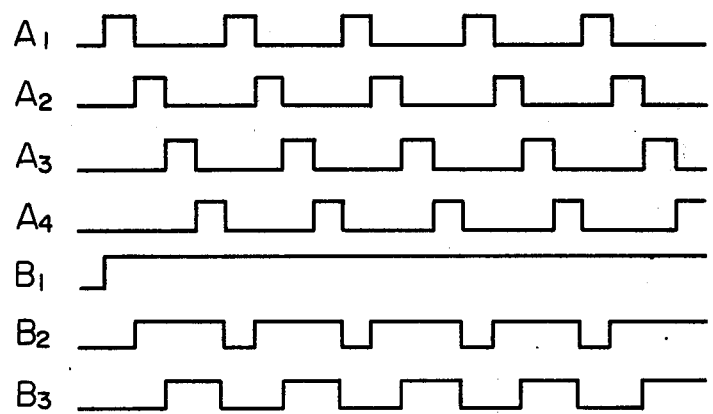
FIG. 17 is a graphical representation of output signals of the AND gates A1 through A4 and OR gates B1 through B3.
Figure 18:
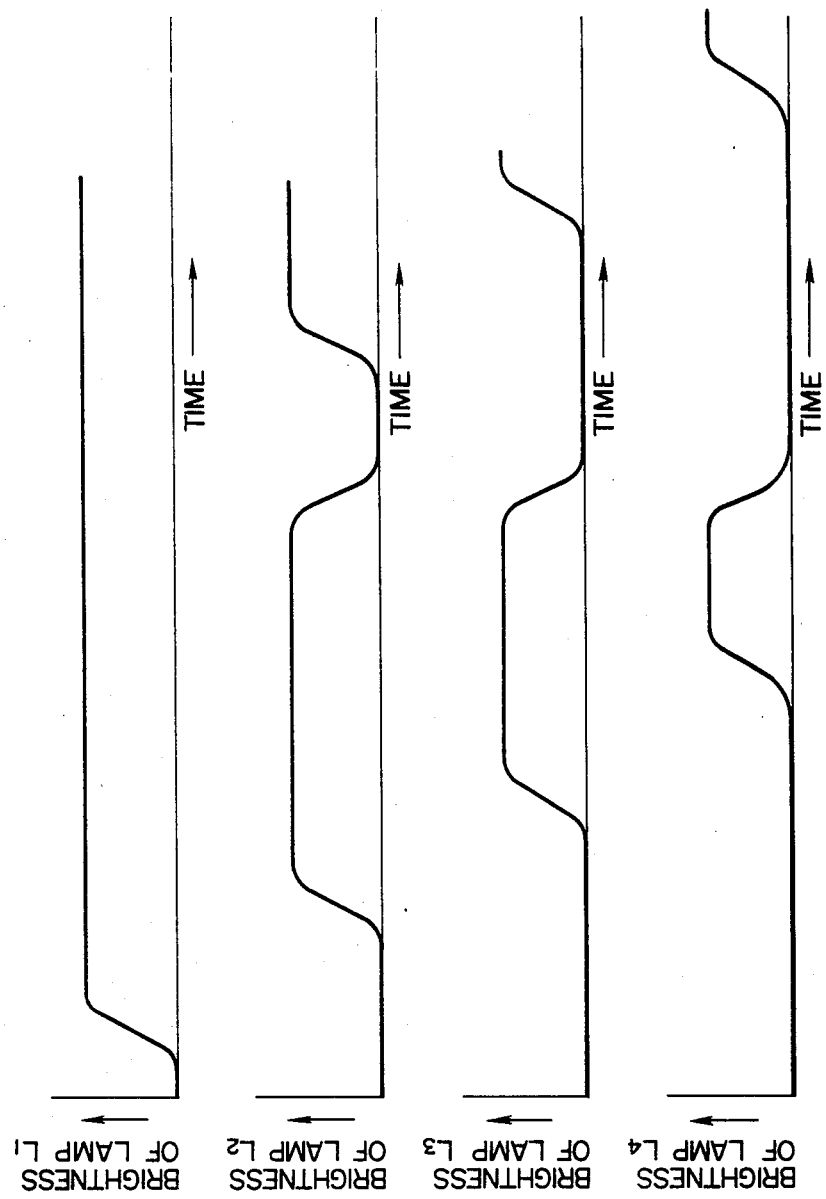
FIG. 18 is a graphical representation of the lighting condition of the lamps L1 through L4 corresponding to the output signals of FIG. 17.

When the sequential circuit 71 is replaced by a sequential circuit 71" shown in FIG. 16, wherein OR gates B1 through B3 are interposed between the AND gates A1 through A4 and resistors R1 through R4 of said circuit 71, output signals shown in FIG. 17 are generated. Consequently, the lamp L1 is always alight, the lamp L3 turns on after the lamp L2, and the lamp L4 after the lamp L3, as shown in FIG. 18. Accordingly, the lamps L2 through L4 turn on and off intermittently and successively, repeating said cycle.

In all above-described embodiments, the lamps 641 through 644 and L1 through L4, serving as light sources, include not only incandescent lamps but also light-emitting diodes and other suitable radiating means.

What is claimed is:

1. An automobile air-condition indicator which comprises an automobile air conditioner proper, comprising, at least, a plurality of air intake and blow-out ducts, a plurality of dampers to open and close said ducts and a fan unit, an air conditioner operating device to operate at least said dampers and fan unit, a lamp device that is turned on and off by switching means actuated by said air conditioner operating device, means for moving the lighting point of said lamp device, and a display panel drawn with a picture of the structure of a car, at least that in the vicinity of the front seat thereof, in which the air-condition indicator is provided, wherein indications on said display panel, in positions corresponding to the flows of air from the air conditioner proper caused by the operation of the air conditioner operating device, are illuminated by said lamp device turned on by said air conditioner operating device, with the lighting point thereof moved by said moving means.

2. An automobile air-condition indicator according to claim 1, wherein indications on said display panel, in positions corresponding to the flows of air into and out of the air conditioner proper caused by the operation of the air conditioner operating device, are illuminated.

3. An automobile air-condition indicator according to claim 2, wherein said lamp device and lighting point moving means comprise a flicker cathode glow lamp.

4. An automobile air-condition indicator according to claim 2, wherein said lamp device comprises a plurality of lamps, and said lighting point moving means comprises a sequential circuit to successively turn on and off said plurality of lamps in an arbitrary order.

5. An automobile air-condition indicator according to claim 1, wherein said lamp device and lighting point moving means comprise a flicker cathode glow lamp.

6. An automobile air-condition indicator according to claim 1, wherein said lamp device comprises a plurality of lamps, and said lighting point moving means comprises a sequential circuit to successively turn on and off said plurality of lamps in an arbitrary order.

7. An automobile air-condition indicator according to claim 6, wherein said sequential circuit is adapted to turn on the plurality of lamps in the order in which said lamps are arranged and one at a time.

8. An automobile air-condition indicator according to claim 6, wherein said sequential circuit is adapted to turn on the plurality of lamps in the order in which said lamps are arranged and in such a way that the closing stage of lighting of one of paired, adjacent lamps overlaps with the early stage of lighting of the other.

9. An automobile air-condition indicator according to claim 6 wherein said sequential circuit is adapted to turn off the plurality of lamps in the order in which said lamps are arranged and one at a time.

10. An automobile air-condition indicator according to claim 1, which comprises a transparent display panel drawn with a picture of the structure of a car, at least that in the vicinity of the front seat thereof, a smoked panel disposed behind said display panel, a shielding plate disposed behind said smoked panel and cut with indications, partitions to divide a space behind said shielding plate so that no light passes between individual divided spaces, and said lamp devices disposed in said divided spaces, wherein said lamp devices are lighted to perceptibly illuminate said indications to indicate the flow of air from the air conditioner proper.

11. An automobile air-condition indicator according to claim 10, wherein a Fresnel lens is attached to the display panel.

12. An automobile air-condition indicator according to claim 1, which comprises a display panel, made of a smoked panel and drawn with a picture of the structure of a car, at least that in the vicinity of the front seat thereof, a shielding plate disposed behind said display panel and cut with indications, partitions to divide a space behind said shielding plate so that no light passes between individual divided spaces, and said lamp devices disposed in said divided spaces, wherein said lamp devices are lighted to perceptibly illuminate said indications to indicate the flow of air from the air conditioner proper.

13. An automobile air-condition indicator according to claim 1, wherein the display panel is provided contiguous to the air conditioner operating device.

14. An automobile air-condition indicator according to claim 1, wherein the display panel is provided in a meter cluster.

15. An automobile air-condition indicator according to claim 1, wherein the display panel is provided in the front portion of a console box longitudinally extending between the driver and assistant-driver seats and the air conditioner operating device in the rear portion thereof.

16. An automobile air-condition indicator according to claim 1, wherein the lamp device is covered with a light-pervious cap of an arbitrary color.

17. An automobile air-condition indicator according to claim 1, which comprises a lever provided to the air conditioner operating device to open and close said ducts by moving said dampers in the air conditioner proper and a plurality of switches provided to said air conditioner operating device and adapted to close when said lever comes in a given position, wherein said plurality of switches are connected to said plurality of lamp devices.

18. An automobile air-condition indicator according to claim 1, which comprises a lever provided to the air conditioner operating device to open and close said ducts by moving said dampers in the air conditioner proper, a plurality of switches attached to said lever, and a switching member provided to the air conditioner operating device to close a desired one of said switches dependent on the position of said lever, wherein said plurality of switches are connected to said plurality of lamp devices.

* * * * *